United States Patent [19]

Gardner

[11] 4,033,131
[45] July 5, 1977

[54] TWO STAGE SERVOMOTOR
[75] Inventor: Delbert J. Gardner, South Bend, Ind.
[73] Assignee: The Bendix Corporation, South Bend, Ind.
[22] Filed: Sept. 8, 1975
[21] Appl. No.: 611,288
[52] U.S. Cl. .................................. 60/553; 60/554; 91/369 A; 91/373; 91/434
[51] Int. Cl.[2] .......................................... B60T 13/20
[58] Field of Search ............ 60/553, 572, 592, 550, 60/562, 554; 91/369 A, 391 R, 434, 373

[56] References Cited
UNITED STATES PATENTS 3,972,191  8/1976  Grabb .................................. 60/553
3,990,241  11/1976  Owens .................................. 60/553

Primary Examiner—William R. Cline
Assistant Examiner—Abraham Hershkovitz
Attorney, Agent, or Firm—Leo H. McCormick, Jr.; William N. Antonis

[57] ABSTRACT

In a servomotor having a two stage output created by the transfer of an operational force from a first diameter piston to a concentric second diameter piston, a control valve is concentrically located within the second diameter piston to provide for a uniform transition from the first diameter piston to the second diameter piston.

7 Claims, 2 Drawing Figures

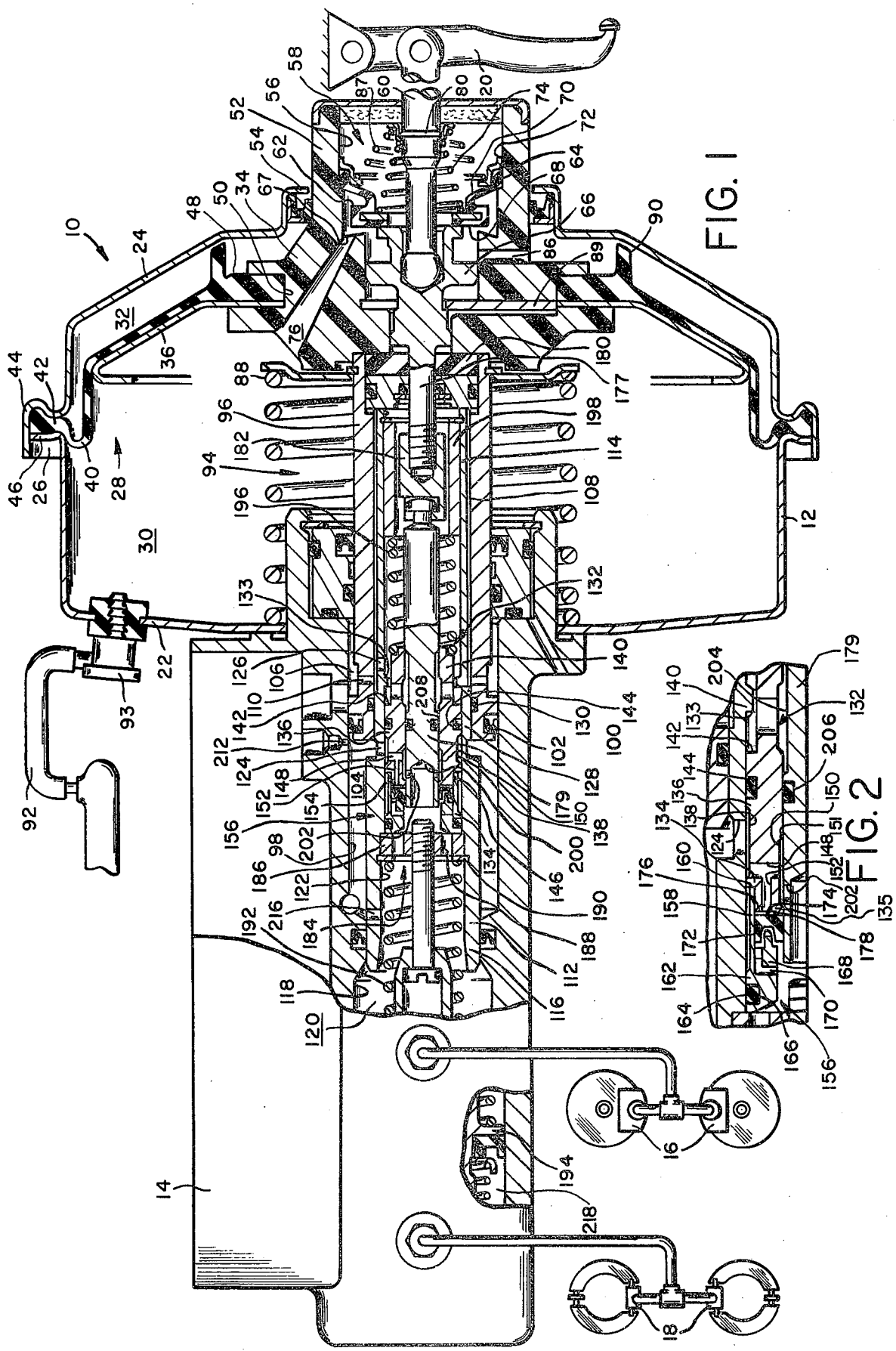

TWO STAGE SERVOMOTOR

BACKGROUND OF THE INVENTION

In copending U.S. Application Ser. No. 481,433 and now U.S. Pat. No. 3,911,681, incorporated herein by reference, it is disclosed how a stepped diameter piston can sequentially produce a first pressure force and a second pressure force when a transfer control valve is operated by movement of a plunger connected to an input push rod. An output force is created in a servomotor by the development of a pressure differential acorss a wall. The stepped diameter piston is connected to the wall. When the transfer control valve is activated, the output force is shifted from the first diameter to the second diameter to produce an added output potential. However, in the event that the pressure differential across the wall does not develop, the transfer control valve directly shifts the input force from the first diameter to the second diameter completely eliminating the development of the first pressure force.

In copending U.S. Application Ser. No. 484,381 and now U.S. Pat. No. 3,937,021, incorporated herein by reference, a hold-off means is disclosed for delaying the development of the second pressure force until the first pressure force reaches a predetermined valve before the transfer control valve is activated by he input force. In this servomotor means, a stepped piston means divides the pressurizing chamber of the pressurizing mechanism into a first section and a second section. The first section is connected to a relief chamber through the transfer control valve. The relief chamber is connected to a reservoir through a flow path. A tilt valve means located in the flow path allows communication of fluid from the reservoir, when a stem thereon engages the stepped piston, and prevents communication of fluid from the relief chamber when the stepped piston disengages the stem. As the stepped piston moves in response to the input force, the first piston transfers fluid from the first section through the transfer control valve into the relief chamber. The hold-off means prevents any fluid from escaping from the relief chamber until the first pressure force reaches a predetermined value. This same first pressure force is simultaneously supplied to the wheel brakes. When the first pressure force reaches the predetermined valve, the hold-off means releases fluid to the reservoir and permits the input force to act through that portion to provide an added output as a second pressure force for operating the wheel brakes. However, if the transfer valve is rapidly modulated, fluid from the second section will be transferred to the first section when the valve is released and afterwards released into the reservoir. This reduction in fluid from the brake system will allow the stepped piston means to contact the bottom of the bore in the second section before the optimum second pressure force is developed.

In copending U.S. Application Ser. No. 511,413 and now U.S. Pat. No. 3,910,046, incorporated herein by reference, a control means is disclosed for adding compensatory fluid to the braking system to replace the fluid transferred to the relief valve during the transfer of the input force from the first diameter to the second diameter of the power piston. However, in such a device if the shift of the operational mode from the first diameter to the second diameter in response to the input force is transmitted in an oscillating manner a corresponding change in the displacement volume of the power braking unit will occur which may result in an inadequate quantity of hydraulic fluid to operate the power braking system.

Later in copending U.S. Application Ser. No. 603,430 and now U.S. Pat. No. 3,972,191, incorporated herein by reference , a balanced control valve was added to provide the servomotor with a smooth transition when the operation was shifted from the first stage to the second stage.

SUMMARY OF THE INVENTION

I have devised a power braking apparatus having a first diameter piston means concentric to a second diameter piston means for transmitting an output force to a pressurizing means supplying an actuation force to wheel brakes in a braking system. The first diameter piston is fixed to the movable wall of a servomotor and extends into a first pressurizing chamber of the pressurizing means. The second diameter piston has a first end which extends into a second pressurizing chamber and a second end which abuts a reaction means confined in the movable wall. The second diameter piston has an axial bore therethrough with a first radial bore separated from a second radial bore. The first radial bore is connectd to the first pressurizing chamber while the second radial bore is connected to a relief chamber. A sleeve means concentrically located in the second diameter piston has a first radial bore adjacent one end thereof. A spring holds the sleeve means against a retainer attached to the second diameter piston to align the first radial bores and permit free communication between the first pressurizing chamber and the second pressurizing chamber. An actuator means has a cylindrical section concentrically located within the sleeve means. The cylindrical section has a radial bore separated from a groove by a land section. Upon an operator providing an input force, the actuator mens opeates the servomotor to develop an operational force which simultaneously moves the first diameter piston and the second diameter piston to pressurize the fluid in the first pressurizing chamber and a first pressurizing force. The first pressurizing force acts on the sleeve means in opposition to the spring and moves the radial bore therein out of alignment with the radial bore in the second diameter piston. When a predetermined first pressure force is reached, the sleeve means engages a stop on the second piston means. Further input from the operator moves the groove in the cylindrical section of the actuator means into communication with the radial bore in the sleeve means to allow a portion of the fluid in the first pressurizing chamber to escape into the relief chamber. As the fluid escapes from the first pressurizing chamber, the operational force from the servomotor moves the second diameter piston in the second pressurizing chamber to provide the braking system with an additional braking force.

It is therefore the object of this invention to provide a two stage servomotor with a control means whereby the transition from the first stage is regulated by both the output force created in the first stage and the input force supplied by the operator.

It is a further object of this invention to provide a control for a two stage servomotor having a sleeve means through which fluid in a first pressurizing chamber can freely pass into a second pressurizing chamber until the first pressurizing force moves the sleeve means against a stop, thereafter an input force is required to move a groove on a cylindrical means into a position whereby the fluid in the first pressurizing chamber is allowed to escape into a relief chamber and the fluid in the second pressurizing chamber further pressurized to provide a braking system with an additional output.

These and other objects will become apparent from reading this specification and viewing the drawing.

BRIEF DESCRIPTION OF THE DRAWING

FIG. 1 is a schematic illustration of a power braking system with a sectional view of a two stage servomotor having a control means through which the output from a wall means is uniformly transferred from a first diameter to a second diameter piston in response to an output force developed in response to an input force and FIG. 2 is a sectional view showing an enlarged portion of the control means fo FIG. 1

DETAILED DESCRIPTION OF THE PREFERRED EMBODIMENT

The braking system 10, shown in the drawing has a fluid pressure servomotor 12 connected to a master cylinder 14 for supplying the front wheel brakes 16 and rear wheel brakes 18 with an operational hydraulic force in response to an input force applied to pedal 20 by an operator.

The fluid pressure servomotor 12 has a first shell 22 joined to a second shell 24 by a twist lock arrangement 26. A movable wall means 28 is located within the first shell 22 and the second shell 24 to form a first variable volume chamber 30 and a second variable volume chamber 32. The wall means 28 has central hub 34 with a backing plate 36 extending therefrom. A diaphragm 40 has a first bead 42 on its periphery which is held between flange 44 and flange 46 on the first shell 22 and the second shell 24, respectively, and a second bead 48 which is snapped into groove 50 adjacent the backing plate 36.

The hub 34 has a rearwardly extending projection 52 which extends through opening 54 in the second shell 24. The projection 52 has an axial bore 56 into which a control valve means 58 is located and supplied with an operational input from pedal 20 through push rod 60.

The control valve means 58 has a poppet assembly 62 which is sequentially operated upon movement of a plunger 66 by the push rod 60 to interrupt vacuum and allow air to develop a pressure differential across the wall means 28.

The poppet assembly 62 has a face 68 which is separated form a fixed bead 64 by a flexible section 70. The bead 64 is retained within bore 56 by a retainer 72 which biases the bead 64 against the projection 52. A first spring 74 connected to shoulder 80 on push rod 60 urges the face 68 toward a vacuum seat 67 adjacent vacuum passage 76. The vacuum passage 76 connects the first chamber 30 with the interior bore 56 of the hub means 34. A second spring 87 urges the plunger 66 against stop 89 to allow vacuum to enter the rear chamber 32 through passage 86.

A return spring 88 located between the shell 22 and hub means 34 urges bumper 90 on diaphragm 40 toward shell 24. In this position, vacuum is communicated from the intake manifold through conduit 92 past check valve 93 into the front chamber 30 and will evacuate air from the second variable volume chamber 32 by flowing through passage 86 in bore 56 and out passage 76 to vacuum suspend the wall means 28.

A ratio changer means 94 has a first piston 96 fixed to the hub means 34 which extends into bore 98 of the master cylinder 14. A shoulder 100 on the first piston 96 has a diameter which substantially fills bore 98 and provides a support for seal 102 to segregate a first pressurizing chamber 104 from a relief chamber 106. The first piston has an internal bore 108 connected to the relief chamber 106 through a series of radial holes 110.

A second piston 112 has a first section 114 which is concentrically located within bore 108 of the piston 96 and a second section 116 which projects into bore 118 to form an outlet or second pressurizing chamber 120 in the master cylinder 14. The second piston 112 has an axial bore 122 with a first radial bore 124 separated from a second radial bore 126 by a land section 128. A seal 130 is located in the first piston 96 to prevent communication between the first radial bore 124 and the second radial bore 126. The second piston 112 has a shoulder 133 located between the first radial bore 124 and the second radial bore 126.

A sleeve means 132 is concentrically located in the axial bore 122 to control the communication of fluid through the first radial bore 124 and the second radial bore 126 in the second diameter piston 112. The sleeve means 132 as best seen in FIG. 2 has a first land section 134 separated from a second land section 136 by a first groove 138. A projection 140 extends from the second land section 136 to establish a shoulder 142. A seal 144 located in the second land section prevents fluid from flowing along the axial bore 122 between the first pressurizing chamber 104 and the relief chamber 106. An annular porjection 146 which extends from the first land section 132 to the end of the sleeve means 132 has radial bore 148 which connects the first groove 138 with a second groove 150. In addition the first land 134 has a plurality of axial holes or passages 152 which connect the radial bore 148 with the end 154 of annular projection 146.

A tubular means 156 has a first wall or sleeve section 158 which surrounds the annular projection 146 which extends from the first land 134 and a second wall or land section 162 which engages the axial bore 122. The end of the wall or sleeve section 158 engages the shoulder 160 formed with the first section 134. A seal 164 located in a groove 166 of the second wall section 162 keeps fluid present in the axial bore 122 from being communicated along the periphery of the first land section 134.

An annular seal expander 168 abuts the second wall section or cylindrical body and is located along the inner periphery of the first wall or sleeve section 158. The annular seal expander 168 has a series of passageways 170 (only one being shown in FIG. 1) which allows fluid to flow into the axial bore 122 after passing around the annular lip seal 172. The annular lip seal 172 has a base 174 which abuts washer 176 to prevent the seal from being extruded into axial passages 152. The washer 176 is located in a recess 178 on the end 154 of the annular projection 146 which extends from the first land section 134.

A retainer means 184 has a disc 186 with a series of centrally located axial passages 188 through which fluid is communicated into the outlet chamber 120 from the first pressurizing chamber 104. The disc 186 is retained in the axial bore 122 by a snap ring 190. The snap ring 190 also acts as a stop for spring 192 which actuates the second piston 194 in the master cylinder 14.

A spring 196 located in the axial bore 122 is positioned between the end of the projection 140 and spacer 198. The spring 196 urges the sleeve mens 132 against the retainer means 184 to align the first radial bore 124 to permit groove 150 through free communication of fluid into the axial bore 148.

The plunger 66 has a first cylindrical section 177 which extends through the reaction disc 180 and a second cylindrical section 179 which is concentrically located within the sleeve means 132. The first cylindrical section 177 is joined to the second cylindrical section 179 by an adjustable connector 182. The second cylindrical section 179 has a blind axial bore 200 therein located along the end adjacent the retainer means 184. A series of radial bores 202 connect the blind axial bore 200 with the second groove 150 to provide a first flow path between the first prssurizing chamber 104 and the axial bore 122. The second cylindrical section 179 has a groove 204 as best seen in FIG. 2 located on its peripheral surface. A seal 206 separates the groove 204 from the radial bore 202. The seal 206 is separated from the groove 204 by a sharp edge lip 208.

MODE OF OPERATION OF THE PREFERRED EMBODIMENT

During a braking sequence, when an operator applies an input force to pedal 20, push rod 60 moves and allows spring 70 to move face 68 of the poppet assembly 62 against vacuum seat 67 to interrupt communication between the first chamber 30 and bore 56 through passage 76. Further movement of the push rod 60 moves the atmospheric seat 69 away from face 68 and allows air at atmospheric pressure present in bore 56 to enter the rear chamber 32 through passage 86. With air in the rear chamber 32 and vacuum in the front chamber 30, a pressure differential is created across the wall means 28. This pressure differential will create an operational force which will be transmitted through the hub means 34 to move the piston means 94 in bore 98 of the master cylnder 14. As the first piston 96 moves in the first diameter section 98, a first hydraulic pressure develops in the pressurizing chamber 104 after the lip seal 102 has moved past compensator port 212. This first hydraulic pressure is communicated through radial bore 124 into the first groove 138 through radial bore 148 in the sleeve means 132, past the second groove 150 into radial bore 202, through the axial bore 122 into the outlet chamber 120 for communication to the front wheel brakes 16. At the same time spring 192 amd the fluid pressure in chamber 120 moves piston 194 to develop a corresponding hydraulic pressure in chamber 218 for operating the rear wheel brakes 18.

The fluid pressure in the outlet chamber 120 acts on the second diameter piston means 112 to transmit a reaction force into disc 180 and also acts second cylindrical section 179 to directly transmit a reaction force to push rod 60 to inform the operator of the intensity of the fluid force being transmitted to the wheel brakes 16.

At the same time, the first fluid under pressure acts on face 162 of the tubular means 156 to move the sleeve means 132 in opposition to spring 196. As some predetermined fluid pressure, lip 135 of the first land section 134 moves past radial bore 202. Further movement of the piston means 96 flows fluid through the radial bore 124 into the first groove 138 to the radial bore 148, out the axial passages 152, past lip seal 172, and into the outlet chamber 120 for distribution to the wheel brakes 16. As the operator increases the input force through the push rod 60, the pressure differential across wall means 28 corresponding increases until the rear chamber 32 is completely filled with air at atmospheric pressure, commonly referred to as "vacuum runout". At some vacuum pressure before vacuum runout, shoulder 142 on the sleeve means 132 engages shoulder or stop 133 and seal 206 is adjacent edge 151 of the second groove 150. Any further input from the operator is transmitted from plunger 66 through the first cylindrical section 177 to move the second cylindrical section such that fluid is metered from the second groove 150 past lip 208 into groove 204 and communicated to the relief chamber 106. As the pressure in the first pressurizing chamber is being reduced, the output from the wall means 28 is transferred through the reaction disc 180 to move the second piston 112 in the outlet chamber 120 to develop an additional output force for operating the master cylinder 14.

Upon termination of the input force on the pedal 20, return spring 87 moves the atmospheric face 67 against face 68 to allow vacuum present in chamber 30 to evacuate the rear chamber 32 and again suspend the wall means 28. At the same time, spring 196 moves the sleeve means 132 in the axial bore 122 such that the communication between the first chamber 104 and the outlet chamber 120 is provided through the radial bores 124, 148 and 202.

As the pressure differential across the wall means 28 is further reduced, return spring 88 moves piston means 112 out of the outlet chamber 120 to allow fluid to be communicated through compensator ports 212 and 216 to replenish any fluid lost during previous brake applications.

I claim:

1. In a power brake apparatus having a servomotor with a control means for transferring an output force of a wall means from a first piston means to a concentric second piston means to produce an additional operational force to activate the wheel brakes in a vehicle in response to an operator input force, said control means comprising:

a housing having a first diameter bore and a second diameter bore therein, said first piston means being located in said first diameter bore to establish a first pressurizing chamber and a relief chamber therewith, said second piston means being concentrically located in the first piston means and extending into said second diameter bore to establish a second pressurizing chamber therewith;

said second piston means having an axial passageway therethrough;

sleeve means located in said axial passageway having a first radial bore therein;

stop means connected to said second piston means for retaining said sleeve means in said axial passageway;

resilient means located in said axial passageway for urging said sleeve means toward said stop means; and actuator means having a cylindrical body concentric to said sleeve means with a second radial bore therein, the first pressurizing chamber being connected with said axial passageway through said first and second radial bore body said cylindrical having a groove therein in communication with said relief chamber said actuator means intially operating said servomotor to allow said wall means to simultaneously move said first and second piston means in said first and second diameter bores to establish a first pressurizing force for activating said wheel brakes; a face on said sleeve means, a first seal means mounted adjacent said sleeve means, said first pressurizing force acting on said face to move said first radial bore away from the second radial bore by overcoming said resilient means, the first seal means interrupting communication-through said first and second radial bores; said actuator means thereafter moving said groove into communication with said first radial bore to allow fluid in said first pressurizing chamber to escape through said first radial bore and said groove into the relief chamber and permit said wall means to move said second piston means in said second diameter to develop said additional operational force.

2. The power brake apparatus, as recited in claim 1 wherein said second piston means includes:
an annular shoulder located in said axial passageway for limiting the movement of said sleeve means in overcoming said resilient means.

3. The power brake apparatus, as recited in claim 2 wherein said
first seal means located adjacent said sleeve means and in relationship with surrounding said cylindrical body of the actuator means for allowing fluid in said first pressurizing chamber to flow into the second pressurizing chamber during the development of said first pressurizing force and for preventing fluid from flowing from the second pressurizing chamber into the first pressurizing chamber during the devlopment of said additional operational force.

4. The power brake apparatus, as recited in claim 3, wherein said control means further includes:
retainer means located between said first seal means and said sleeve means to prevent said additional operational force from bringing said seal means into engagement with the sleeve means.

5. The power brake apparatus, as recited in claim 4, wherein said sleeve means further includes:
a series of axial passages for connecting said first radial bore with a surface adjacent the retainer means.

6. The power brake apparatus, as recited in claim 5, wherein said actuator means includes:
plunger means connected to an input push rod for operating the valve through which a pressure differential is created across the wall means to produce said output force, said plunger means having stem which is connected to said cylindrical body for transmitting a reaction force corresponding to the fluid pressure in said second pressurizing chamber to inform the operator of the braking forces being transmitted to the wheel brakes.

7. The power brake apparatus, as recited in claim 6, wherein said actuator means further includes:
second seal means located adjacent said groove to prevent communication between the first radial bore and the groove during the devlopment of said first pressurizing force.

* * * * *